July 22, 1969  R. J. GREENLER  3,457,056
METHOD OF AND CHAMBER FOR THE MANUFACTURE OF GLASS
Filed June 14, 1967  2 Sheets-Sheet 1

ROBERT J. GREENLER
INVENTOR
BY John R. Faulkner
William E. Johnson
ATTORNEYS

July 22, 1969   R. J. GREENLER   3,457,056
METHOD OF AND CHAMBER FOR THE MANUFACTURE OF GLASS
Filed June 14, 1967   2 Sheets-Sheet 2

ROBERT J. GREENLER
INVENTOR

BY John R. Faulkner
William E. Johnson
ATTORNEYS 3,457,056
METHOD OF AND CHAMBER FOR THE
MANUFACTURE OF GLASS
Robert J. Greenler, Monroe, Mich., assignor to Ford
Motor Company, Dearborn, Mich., a corporation of
Delaware
Filed June 14, 1967, Ser. No. 645,936
Int. Cl. C03c 15/02; C03b 18/00
U.S. Cl. 65—32                                   6 Claims

ABSTRACT OF THE DISCLOSURE

A chamber utilized in the "float process" of manufacturing glass has a molten tin bath contained in a bottom portion thereof. A carbon liner is contained in the molten bath to interact with and rid the float system of oxygenous impurities. The liner is constructed such that areas of the liner located outside of the edges of a glass ribbon floating on the tin contain 20 to 40 parts per million of a metal selected from the group consisting of sodium, potassium, vanadium, and copper and are more reactive toward the oxygenous impurities than the areas of the liner located directly beneath the ribbon.

BACKGROUND OF THE INVENTION

This invention relates to the construction of a chamber for utilization in the manufacture of flat glass by the so-called "float process." In the "float process," molten glass is poured on the surface of a molten bath contained in a chamber to obtain a glass ribbon having true parallelism of its opposite faces and a lustrous, fire-polished finish.

Generally, in the "float process" the molten bath is formed from metal having a density greater than that of molten glass. By known means, the molten glass is delivered at a uniform rate to the surface of the molten metal bath to form a ribbon of glass. The ribbon is then advanced along the surface of the bath under thermal conditions which permit the leading portion thereof to continuously harden to a degree sufficient to permit its removal from the bath without harm to the surface thereof. Upon its removal from the chamber, the ribbon of glass passes through an annealing lehr and is subjected to further conventional processing.

The molten metal bath, which supports the glass, is contained within a substantially enclosed chamber having upper and lower refractory sections joined by side and end wall structures. The end wall structures have therein entrance and exit passageways through which, respectively, the molten glass is fed to and the glass ribbon removed from the chamber. The lower refractory section forms the container for receiving and supporting the molten metal bath. The space within the chamber above the bath is filled with a protective atmosphere to prevent oxidation of the metal forming the bath.

The "float process" of manufacturing glass has been improved by lining at least a portion of the chamber containing the molten metal bath with slabs of a carbonaceous material. Such slabs, usually made from graphite, are positioned in the chamber in a manner and for a purpose more fully disclosed in copending U. S. patent applications Ser. No. 409,664, filed Nov. 9, 1964, now abandoned, and Ser. No. 497,949, filed Oct. 19, 1965, now U. S. Patent 3,393,061, both of which are assigned to the same assignee as this application.

An advancement over prior float chambers in the use of a carbonaceous liner is found in the fact that the liner chemically interacts with the impurities both of the atmosphere and of the molten metal bath associated therewith so as to purge the "float chamber" system of impurities which would otherwise contaminate it. When a prior art, non-carbon lined chamber is utilized in the "float process" of manufacturing glass, there is a tendency for foreign contaminants to seep into the system and then to react selectively with the metal forming the molten bath. When the metal is thin, the reaction products, such as a tin oxide, are drawn by some mechanism into the surface of the glass contacting the tin in the chamber and subsequently cause a defect in the finished glass known as "bloom." "Bloom" is the descriptive title applied to glass in which tin oxides on the surface thereof become iridescent upon reheating of the glass to bending temperatures and thus become visible to the eye.

By utilization of a carbonaceous liner in a float chamber, the defect of "bloom" is substantially reduced as impurities in the chamber react selectively with the liner rather than with the metal bath. However, because of the chemical interaction between the carbonaceous liner, the atmosphere and the molten metal bath, bubbling is produced in the bath to a minor degree when the chemical interaction occurs. This phenomenon is known as "chemical reaction bubbling" and some of the bubbles produced pass up through the bath and come into engagement with the underside of the glass ribbon floating on the bath. This engagement results in an indentation in the surface of the glass and causes a subsequent scrapping of at least that portion of the glass.

Thus, the utilization of a carbonaceous liner in a chamber for the "float process" of manufacturing flat glass has proved extremely beneficial in the area of eliminating "bloom" in the suface of the finished glass. However, bubbling defects are occasionally caused in the glass ribbon by the "chemical reaction bubbling" which occurs when the atmosphere, the liner and the molten metal bath interact in order to rid the "float chamber" system of impurities.

SUMMARY OF THE INVENTION

This invention is directed to a method of and a chamber for utilization in the "float process" of manufacturing glass and, more particularly, the invention is directed to the method of operating and construction for such a chamber which results in a substantial reduction of the number of "chemical reaction bubbling" defects which occur in a glass ribbon produced in the chamber.

In its prefered form, a substantially enclosed chamber utilized for the manufacture of glass is constructed so that a plurality of refractory blocks define a cavity or container for holding molten tin therein. The molten tin receives and supports thereon a glass ribbon which is narrower than the tin bath so that portions of the bath are exposed to the interior of the chamber. An atmosphere, substantially inert to both carbonaceous material and to molten tin but actively reducing to tin oxide, is supplied to the interior of the chamber. A liner of carbonaceous material, submersed at least partly in the tin bath, extends at least partly across the width of the bath and has a portion thereof outside the edges of the glass ribbon and a portion thereof underlying the ribbon. The portion of the liner outside the edges of the glass is constructed of a carbonaceous material more reactive toward oxygenous impurities than the carbonaceous material utilized to construct the portion of the liner underlying the glass. By such construction, the reaction of the liner and the oxygenous impurities occurs almost exclusively at the portion of the liner outside the edges of the glass thereby significantly reducing the number of indentation defects in the glass ribbon.

BRIEF DESCRIPTION OF THE DRAWINGS

FIGURE 2 is a plan view, in cross section, of the improved chamber of FIGURE 1.

DESCRIPTION OF THE PREFERRED EMBODIMENT

Figure 1:
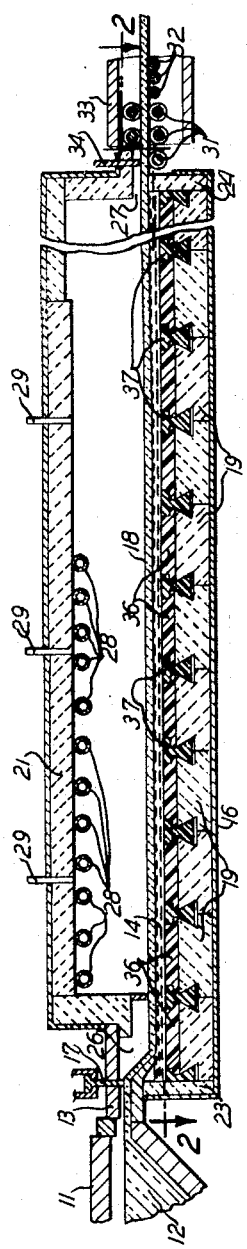
FIGURE 1 is an elevational view, in cross section, showing the improved chamber of this invention for utilization in the manufacture of flat glass.

In FIGURE 1 there is seen the delivery end of a conventional glass melting furnace 11 in which a constant level of molten glass 12 is maintained. The molten glass is delivered through a forehearth 13 onto the surface of a molten metal bath 14 of tin or an alloy of tin contained within a chamber 16. A tweel 17 controls the rate at which the glass 12 flows from the furnace 11. The bath 14 has a density greater than that of the glass 12 so that the glass will float on the surface thereof. By delivering the glass at a constant rate to the bath 14, a continuous ribbon of glass 18 of uniform width is produced.

The chamber 16 comprises a lower refractory section 19, an upper refractory section 21, refractory side sections 22 and refractory end walls 23 and 24, all of which refractory walls or sections are both formed from a plurality of refractory blocks and joined together except for an entrance 26 and an exit 27 to provide the substantially enclosed chamber 16. The refractory side sections 22 and the refractory end walls 23 and 24 project above the top surface of the lower refractory section 19 to define the container or cavity for the bath of molten tin 14.

To maintain the tin in a molten condition and the glass ribbon 18 at the proper temperatures required to form a ribbon of good optical quality, heaters such as electrical heaters 28 (FIGURE 1) are installed in the roof of the chamber 16. Coolers may also be provided in selected zones of the chamber 16 to assure that the glass ribbon 18 will be sufficiently cooled and hardened to be removed through the exit 27 without damage to the ribbon. The electrical heaters 28 are connected to a conventional power source (not shown) and may be individually controlled to provide the desired thermal gradient between the various zones of the chamber 16. Preferably, the molten glass 12 is introduced into the chamber 16 at a temperature of about 1850° F. and then, as the glass solidifies to form the ribbon 18, it is progressively cooled to a temperature of about 1100° F. at the exit 27.

An atmosphere gas is introduced into the chamber 16 through gas inlets 29 in order to provide a protective atmosphere within the chamber above the molten tin and the glass floating thereupon. The atmosphere gas should be inert toward both carbonaceous material and the tin making up the bath and actively reducing toward tin oxide. Also, the atmosphere gas should contain not more than traces of oxygen, carbon dioxide or water vapor. As more fully described in copending U.S. patent application Ser. No. 404,247, filed Oct. 17, 1964, and assigned to the same assignee as this application, now U.S. Patent 3,332,763, a protective atmosphere consisting essentially of 4% carbon monoxide, 4% hydrogen and the remainder inert nitrogen is the preferred inert atmosphere.

The cooled glass ribbon 18 is withdrawn from the chamber 16 by driven traction rollers 31 onto a conveyor 32 to enter an annealing lehr 33 where the ribbon is further cooled under controlled conditions to remove or reduce residual stresses therein. The exit 27 of the chamber 16 may be provided with a sealing member 34 both to retain the protective atmosphere gas in and to prevent the entrance of outside atmosphere into the chamber 16.

Figure 2:
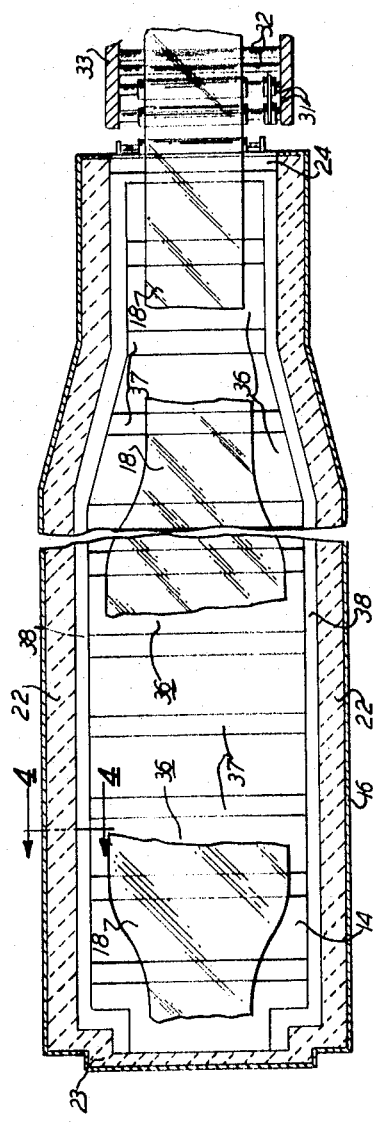

As described in the previously mentioned copending patent application Ser. No. 497,949, a series of rectangular liner slabs 36, of solid carbonaceous material, such as graphite, are provided in the chamber 16. As best seen in FIGURE 2, the slabs 36 are installed so as to cover or line, preferably, the entire bottom area of the tin bath 14 in the chamber 16. In the remaining portion of this description, the slabs 36 will be described as being constructed of graphite.

In FIGURE 2, the individual liner slabs 36 are shown as running the full width of the chamber 16. However, with reference to FIGURES 3 and 4, it should be appreciated that the slabs 36 are coextensive with individual refractory blocks 19 defining the lower refractory section. More particularly, the number of liner slabs 36 is both equal in number to and identical in size with the number of refractory ceramic blocks 19 necessary to define one transverse width of the lower refractory section. Generally, the dimensional size of each liner slab 36 is two feet by three feet. The slabs are sized with the refractory blocks such that if any upheavel in the lower refractory occurs during use of the chamber, the slabs will adjust to the situation and there will be no buckling or cracking of a unitary piece of graphite.

Figure 3:
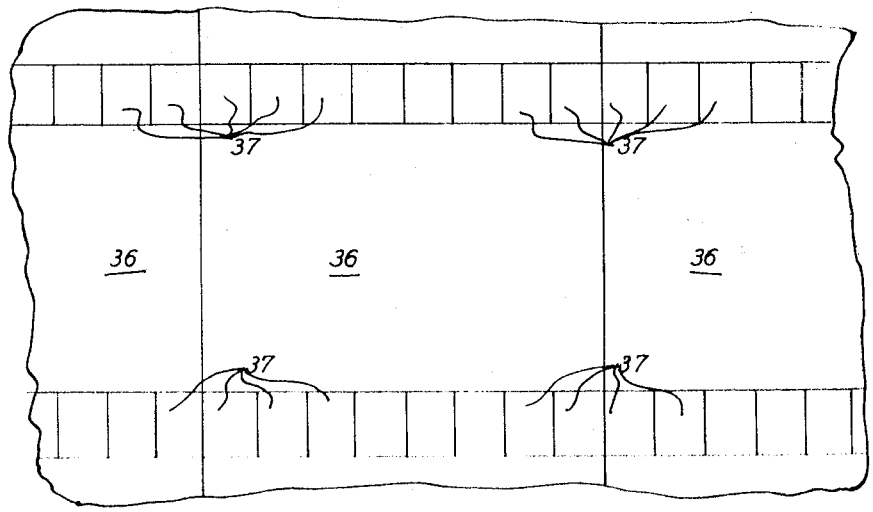
FIGURE 3 is a partial, plan view of a carbonaceous liner installed in the improved chamber of this invention.

With reference to FIGURES 2 and 3, each series of liner slabs 36 is held in position by a plurality of transversely extending keys 37. As best seen in FIGURE 3, there is a plurality of keys 37 associated with each individual liner slab 36. The manner of utilizing the keys and the slabs to line the chamber is described in detail in the above mentioned copending patent application Ser. No. 497,949. The keys 37 are made from the same material as the liner slabs 36.

The liner slabs 36 and keys 37, since they are made from graphite, which is substantially less dense than tin, are raised above the lower refractory section 19 by a buoyant force exerted thereon by the molten tin. The graphite slabs and keys do not rise to the top surface of the tin and float thereupon because of the manner in which the keys 37 are supported by the lower refractory section 19. A depth of tin bath above the slabs 36 is maintained at a level of one-half to four inches in order to reduce the likelihood of the glass ribbon coming in contact with the slabs if and when the glass ribbon buckles within the chamber 16.

Figure 4:
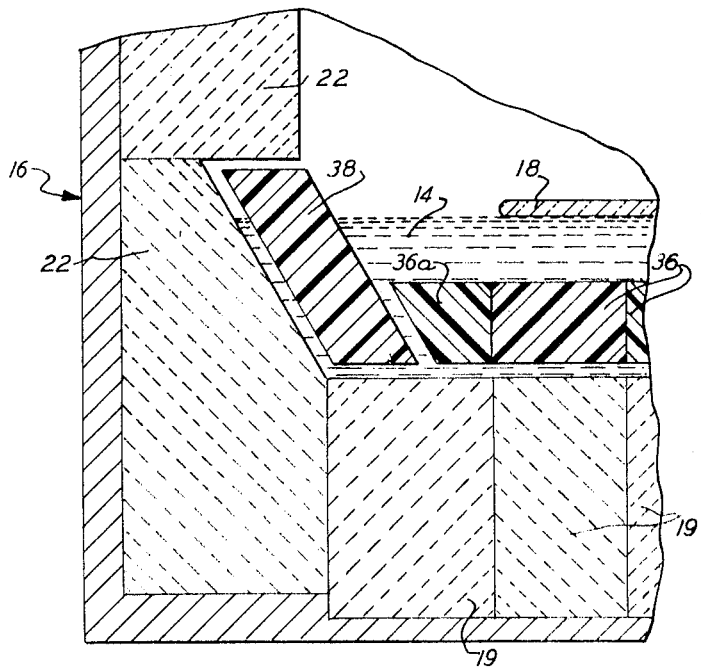
FIGURE 4 is a partial, transverse view of the improved chamber taken along line 4—4 of FIGURE 2.

As best seen in FIGURES 2 and 4, the refractory side blocks 22 extend above the top surface of the lower refractory block 19. A side wall liner 38, comprising one continuous, or in the alternative, several slabs of graphite, is mounted by suitable members (not shown) adjacent the refractory side block 22 for the entire length of each side of the chamber 16. The side wall liner 38 is utilized to provide protection for the refractory side block 22 in the event that the glass ribbon 18 ruptures and a portion thereof moves toward the side wall of the chamber 16.

In operation of the float chamber 16, the protective atmosphere supplied to the chamber will contain a residual or trace amount of oxygen in a form oxidizing to molten tin. Such oxygen may be contained in water vapor, carbon dioxide or as free oxygen. While the amount of such oxygen carried into the chamber per cubic foot of gas is relatively small, the cumulative effect of such oxygen over a period of time presents a problem in manufacturing operations. Oxygen may also be carried into the chamber through seepage of outside atmosphere through cracks or openings of the chamber.

As previously mentioned, the employment of the carbonaceous liner has eliminated the difficulty encountered by oxidation of the molten tin and the subsequent drawing of tin oxide into the surface of the glass ribbon. However, the reaction of the carbonaceous liner with the oxygenous impurities in both the atmosphere and in the molten tin bath result in the production of some gas bubbles which subsequently come into engagement with the glass ribbon floating on the tin bath to cause indentation defects therein.

In accordance with the general principles and teachings of this invention, the graphite liner 36 is constructed in such a manner that the portion of the liner lying outside the lateral edges of the glass ribbon floating on the molten tin bath is constructed from a carbonaceous material which is more reactive toward the oxygenous impurities than the carbonaceous material utilized to construct the portion of the liner located directly beneath the glass ribbon. More specifically, in accordance with the detailed principles and teachings of this invention, the outside liner slab, for example, liner slabs 36a in FIGURE 4, is formed from graphite having a small amount of selected impurities therein which make the graphite more reactive toward oxygenous compounds. As set forth on page 5D.03.01 of The Industrial Graphite Engineering Handbook, as revised in 1965 by The National Carbon Company, a division of Union Carbide Corp., such impurities as 20 to 40 parts per million of sodium, potassium, vanadium or copper may be included in the carbonaceous material utilized to make the liner slab 36a. The carbonaceous material utilized to form the side wall liner 38 may also be made of the more reactive type.

With reference to FIGURE 4, the liner slabs 36 located directly below the ribbon of glass 18 floating on the molten tin bath 14 are made of extremely high purity graphite. Pure graphite is five or six times less reactive toward the oxygenous impurities at a reference temperature of 1000° F. than graphite containing the mentioned impurities.

Thus, by controlling the material from which individual ones of the liner slabs 36 are constructed, it is possible to control the rate at which the individual slabs will selectively react with the oxygenous impurities in both the atmosphere and the bath. By having the more reactive liner portions located at a position outside the lateral edges of the glass ribbon 18, the reaction of the carbonaceous liner and the oxygenous impurities occurs almost exclusively away from the ribbon. Thus, the likelihood of a gas bubble, evolved as a result of the interaction, coming into engagement with the glass ribbon 18 is substantially reduced and the occurrences of indentation defects in the glass, likewise, substantially reduced.

It should be borne in mind that although in the description of the preferred embodiment of this invention, the liner slabs 36a are described as being constructed from graphite having small percentages of impurities contained therein, both types of liner slabs may contain impurities as long as the liner slabs 36a are more reactive toward the oxygenous impurities than the liner slabs 36. By thus controlling the impurity level of the different types of liner slabs, the oxygenous impurities will tend to react at the more reactive sites provided by the liner slabs 36a and thus, concentrate evolution of gas bubbles in the area of the tin bath 14 located outside of the lateral edges of the glass ribbon 18.

In the portion of the chamber maintained at temperatures below 1300° F., the reaction rate of the carbonaceous liner and the oxygenous impurities is extremely low and for practical purposes, nonexistent. Thus, in the portion of the chamber maintained at or below a temperature of 1300° F., the liner slabs 36 need not be constructed so as to have a varying reactivity toward the oxygenous impurities in both the molten tin bath and the protective atmosphere because little bubbling ever occurs in this portion of the chamber.

By utilizing the structure of this invention in a chamber for the manufacture of flat glass, the advantages of employment of a carbonaceous liner in eliminating "bloom" is obtained while the indentation defects accompanying "chemical reaction bubbling" are reduced.

What is claimed is:

1. In a process for manufacturing flat glass which is not susceptible to the formation of tin bloom upon reheating in which: (1) a continuous ribbon of flat glass is formed on a bath of molten tin contained in a refractory float chamber, (2) in which a protective atmosphere which is nonreactive with both carbon and tin over the range of temperatures encountered in the glass float chamber and which is actively reducing to tin oxide is confined within the float chamber, (3) in which said protective atmosphere contains, at most, not more than traces of oxygen, carbon dioxide or water vapor, (4) in which the molten tin bath is confined in a container the inner surface of which comprises carbon refractory, the extent of the carbon refractory being sufficient to react with any oxygenaceous impurities present in the molten tin bath and thereby maintain the molten tin bath substantially free of tin oxide, (5) in which a ribbon of glass is continuously withdrawn from the refractory float chamber, the withdrawn glass having a tin count sufficiently low to prevent formation of tin bloom upon subsequent reheating, the improvement which comprises:

controlling across the width of the bath the reactivity of the carbon refractory toward the impurities of the tin bath by varying the chemical composition of the carbon refractory, the refractory in the areas of the bath not directly underlying the glass ribbon including at least 20 parts per million of metal therein which makes said refractory more reactive toward the impurities of the bath than the refractory underlying the ribbon whereby the gaseous products of reaction produced by the reduction of the tin bath impurities by the more reactive carbon refractory ascend to the atmosphere above the bath substantially entirely in the space provided between the edge of the glass ribbon and the adjacent wall of the refractory chamber.

2. A substantially enclosed chamber utilized in the float process of manufacturing glass; refractory block defining a cavity; molten tin received in said cavity to define a bath for receiving and supporting a ribbon of glass thereon, said glass ribbon being narrower than said bath so that portions of said molten tin lie outside the edges of said ribbon and are exposed to the interior of said chamber; means for supplying to said interior of said enclosed chamber an atmosphere substantially inert both to carbonaceous material and to said molten tin; and a liner of carbonaceous material submersed at least partly within said molten tin bath and extending at least partly across the width of said bath so as to have both a portion thereof outside the edges of said glass ribbon and a portion underlying said glass ribbon, said carbonaceous material reacting with oxygenous impurities in both said protective atmosphere and said tin bath to rid said chamber of said impurities, said portion of said carbonaceous liner located outside the edges of said glass ribbon being constructed of a carbonaceous material containing a metal making said material more reactive with said oxygenous impurities than the carbonaceous material utilized to construct said portion of said liner underlying said glass ribbon whereby the reaction of said carbonaceous liner material and said oxygenous impurities in both said protective atmosphere and said tin bath occurs almost exclusively at said portion of said liner located outside the edges of said glass ribbon.

3. The substantially enclosed chamber utilized in the float process of manufacturing glass as defined in claim 2 wherein in the portion of said chamber in which the temperature is at least below 1300° F. said portion of said liner outside the edge of said glass ribbon and said portion of said liner underneath said ribbon are constructed of a carbonaceous material having essentially the same reactivity with oxygenous impurities.

4. The substantially enclosed chamber utilized in the float process of manufacturing glass as defined in claim 2 further comprising a side wall liner of carbonaceous material at least along a portion of the length of said chamber, said side wall liner being formed of carbonaceous material containing a metal making said material more reactive with said oxygenous impurities than said carbonaceous material used to construct said portion of said liner underlying said glass ribbon and said side wall liner being spaced from the edges of said ribbon so that said exposed area of said molten tin lies between said side wall liner and said edge of said glass ribbon.

5. A substantially enclosed chamber utilized in the float process of manufacturing glass; refractory block defining a cavity; molten tin received in said cavity to define a bath for receiving and supporting a ribbon of glass thereon, said glass ribbon being narrower than said bath so that portions of said molten tin lie outside the edges of said ribbon and are exposed to the interior of said chamber; means for supplying to said interior of said enclosed chamber an atmosphere consisting essentially of 4% carbon monoxide, 4% hydrogen and the remainder nitrogen, which atmosphere is substantially inert both to graphite and to said molten tin; and a liner of graphite submersed at least partly within said molten tin bath and extending at least partly across the width of said bath so as to have both a portion thereof outside the edges of said glass ribbon and a portion thereof underlying said ribbon, said graphite reacting with oxygenous impurities in both said protective atmosphere and said tin bath to rid said chamber of said impurities, said portion of said graphite liner located outside the edges of said glass ribbon being constructed of a graphite material containing 20 to 40 parts per million of a metal selected from the group consisting of sodium, potassium, vanadium and copper, which graphite material is more reactive with said oxygenous impurities than the pure graphite material utilized to construct said portion of said liner underlying said glass ribbon whereby the reaction of said graphite liner and said oxygenous impurities in both said protective atmosphere and said tin bath occurs almost exclusively at said portion of said liner located outside the edges of said glass ribbon.

6. A substantially enclosed chamber utilized in the float process of manufacturing glass; refractory blocks defining a cavity; molten tin received in said cavity to define a bath for receiving and supporting a ribbon of glass thereon, said glass ribbon being narrower than said bath so that portions of said molten tin lie outside the edges of said ribbon and are exposed to the interior of said chamber; means for supplying to said interior of said enclosed chamber an atmosphere consisting essentially of 4% carbon monoxide, 4% hydrogen and the remainder nitrogen, which atmosphere is substantially inert to carbon and to molten tin; a liner of carbonaceous material submersed at least partly within said molten tin bath and extending at least partly across the width of said bath so as to have both a portion thereof outside the edges of said glass ribbon and a portion thereof underlying said ribbon; a side wall liner of carbonaceous material at least along a portion of the length of said chamber; said carbonaceous liner underlying said ribbon being constructed of substantially pure carbonaceous material whereas, both said carbonaceous side wall liner and said carbonaceous liner outside the edges of said glass ribbon being constructed of a carbonaceous material containing 20 to 40 parts per million of a metal selected from the group consisting of sodium, potassium, vanadium, and copper which makes said carbonaceous material more reactive toward the impurities of said tin bath than said substantially pure carbonaceous material whereby the reaction of said graphite liner and said oxygenous impurities in both said protective atmosphere and said tin bath occurs almost exclusively at both said side wall liner and said portion of said liner located outside of the edges of said glass ribbon.

References Cited
UNITED STATES PATENTS 3,305,337    2/1967    Loukes.
3,332,763    7/1967    Basler et al. _____ 65—32
3,393,061    7/1968    Greenler et al.

S. LEON BASHORE, Primary Examiner

E. R. FREEDMAN, Assistant Examiner

U.S. Cl. X.R.

65—65, 90, 99, 157, 168, 374